United States Patent [19]

Holthusen

[11] Patent Number: 4,684,228
[45] Date of Patent: Aug. 4, 1987

[54] PHOTOSETTING APPARATUS

[75] Inventor: Bernd Holthusen, Hamburg, Fed. Rep. of Germany

[73] Assignee: Scangraphic Dr. Boger GmbH, Wedel, Fed. Rep. of Germany

[21] Appl. No.: 896,914

[22] Filed: Aug. 15, 1986

[30] Foreign Application Priority Data

Sep. 3, 1985 [DE] Fed. Rep. of Germany ....... 3531458

[51] Int. Cl.⁴ .............................................. G03B 41/00
[52] U.S. Cl. ........................................ 354/4; 346/108
[58] Field of Search .......................... 354/4, 5, 14, 15; 358/302; 346/108; 355/47, 49, 43, 51

[56] References Cited

U.S. PATENT DOCUMENTS 3,823,276 7/1974 Maslowski et al. ............. 346/108 X
4,260,998 4/1981 Fukui .................................. 354/5 X Primary Examiner—L. T. Hix
Assistant Examiner—Brian W. Brown
Attorney, Agent, or Firm—Townsend & Townsend

[57] ABSTRACT

In a photosetting apparatus which operates with a rotary mirror (25) which is illuminated by a modulated laser beam and which is arranged on a carriage (15), the carriage (15) is axially movably suspended on a tie beam (13) which simultaneously connects two basic members (12) provided at the end faces of the apparatus with one another into a rigid arrangement. A transparent regular cylindrical body (30) is clamped between the basic members and the photosensitive material which is scanned by the laser scanning beam (69) is laid around the transparent regular cylindrical body.

29 Claims, 6 Drawing Figures

PHOTOSETTING APPARATUS

The invention relates to a photosetting apparatus comprising a transparent segment of a regular cylinder around which a photosensitive material can be laid with the photosensitive layer towards the inside, and a rotary mirror illuminated by a laser beam modulated in accordance with the symbols to be set. The rotary mirror is arranged with the laser, the modulator and the image forming optical system on a carriage displaceable in controlled manner along the axis of said segment. The rotary mirror generates a radial scanning beam which leaves the cylinder axis and executes a rapid periodic scanning movement in the peripheral direction of said segment.

In a previously known photosetting apparatus of this kind (DE-OS No. 33 18 311) all the components are mounted on a basic frame which leads to a relatively complex constructional arrangement and makes it difficult to effect the relative adjustment of the segment of the segment of the regular cylinder relative to the laser scanning arrangement.

The principal object of the present invention is thus to provide a photosetting apparatus of the initially named kind which has a clearly arranged, compact layout, but which nevertheless has an inherent stability such that even when placing it on a normal frame, an exact and troublefree exposure of the photosensitive material by the radial scanning beam is ensured, with both the assembly and also the disassembly of the apparatus being possible in simple manner, and with exact relative adjustment of the segment to the laser scanning arrangement also being possible.

In order to satisfy this object the invention provides that said segment of a regular cylinder is held at its end faces at two plate-like basic members which rest on a support and which are connected into a rigid arrangement by a tie beam arranged radially spaced apart from the cylinder axis and carried only by the basic members, with the tie beam being preferably adjustable relative to the basic members perpendicular to the cylinder axis; and that the carriage is axially displaceably held on the tie beam or strut.

In this manner one obtains an extremely simple but nevertheless stable assembly which is largely intensitive to faults or breakdowns as a result of vibrations etc. The basic members and the tie beam are expediently constructed as relatively heavy cast parts, with the relative adjustability between the tie beam, which carries the laser scanning arrangement, and the basic members, which carry the segment of the regular cylinder, permitting an extremely accurate relative alignment between the laser scanning arrangement and the segment. For a qualitatively troublefree exposure of the photosensitive material wrapped around the segment it is necessary that the radial scanning beam generated by the laser emerges precisely from the axis of the segment.

An advantageous embodiment of the invention is so constructed that the tie beam carries radially inwardly two axially extending profiled running surfaces which are arranged spaced apart in the peripheral direction and which face towards or away from one another; and that wheels having a complementary profile and arranged radially outwardly on the carriage contact the profiled running surfaces in such a way that the carriage is reliably held against movements in planes extending perpendicular to the cylinder axis and is only movable axially.

With this arrangement the running surfaces should be formed at the opposite longitudinal edges of a strip rail which is secured to the tie beam. The width direction of the strip rail preferably coincides essentially with the peripheral direction or with the direction of a secant, i.e. a chord of the cylinder. The traverse thus represents not only a precise rigid mechanical connection between the two basic members, which is necessary for troublefree holding of the segment, but in accordance it also ensures troublefree mounting and guidance of the carriage along the tie beam, and thus also relative to the basic members and to the segment of the regular cylinder which is secured to them.

For a constructionally compact arrangement with a large scanning angle it is expedient when the carriage extends substantially radially inwardly away from the tie beam and in particular from the strip rail, and has a carrying plate for the scanning arrangement, with the carrying plate extending past the cylinder axis and being radially spaced therefrom.

A particularly advantageous embodiment of the laser scanning arrangement used in the photosetting apparatus of the invention is characterised in that on the carrying plate there are arranged, optically following one another, the laser near to the running wheels parallel to the cylinder axis, the modulator between two deflecting mirrors parallel to the axes of the running wheels, the collimator parallel to the laser on the cylinder axis, and the rotary mirror inclined at 45° to the cylinder axis and lying thereon, wherein the rotary mirror is secured at the end face of a motor shaft coincident with the cylinder axis.

With this arrangement it is advantageous if the tie beam is arranged laterally at the level of the cylinder axis.

It is particularly expedient if the running surfaces lie spaced apart vertically above one another. The carriage is thus laterally suspended on the tie beam with the wheels lying pairwise above one another.

An arrangement is particularly preferred in which the flat side of the strip rail lies in a vertical plane.

As a result of the construction of the invention it is sufficient for troublefree and vibration-free mounting of the photosetting apparatus for the two basic members to be mounted via resilient buffers on a carrying frame which can in turn be normally erected on the floor of a workroom.

A particularly preferred embodiment is characterised in that said segment is constructed as an at least approximately closed regular cylindrical body; and in that the tie beam is arranged within the regular cylindrical body near to the wall portion thereof remote from said segment, extends through openings in the basic members and is secured to the basic members axially outside of the end faces of the regular cylindrical body.

Thus, in this arrangement, a regular cylindrical body is used which is at least approximately closed on all sides whereby the segment, which is important for the quality of the optical imaging, is particularly well stabilised. Only a part of the surface of the regular cylindrical body is used for the laser exposure. Nevertheless, the regular cylindrical body is preferably of one piece and is transparent throughout.

As a result of this arrangement and of the important feature of the invention that the tie beam does not itself have to carry the regular cylindrical segment or the regular cylindrical body, but instead merely has to hold the two basic members together and to support the carriage, the tie beam can have such a small extent in the peripheral direction that the angle through which the radial scanning beam can effect exposure of the photosensitive material is substantially enlarged relative to the previously known arrangement (DE-OS No. 33 18 311). For a compact construction, which moreover substantially increases the stability of the tie beam, it is expedient for the tie beam to have the shape of a cylindrical segment which is matched to the curvature of the optically inactive wall portion.

This results in the double advantage of a largely space saving accommodation of the tie beam within the regular cylindrical body, and also in a considerably increased stability against bending.

As a result of the construction of the invention it is straightforwardly possible for the tie beam to extend in the peripheral direction over an angle of approximately 90°, and preferably over a few degrees less than 90°. In this way the photosensitive material can be reached and exposed by the radial scanning beam over an angle of approximately 270°.

An advantageous practical embodiment is characterised in that cylinder segment-like narrow projections emerge in opposite peripheral directions from the central beam part on which the running surface or the strip rail are arranged. In this manner the tie beam is of reinforced construction in the region where it has to carry the carriage.

For a problemfree and easily adjustable connection between the tie beam and the basic bodies it is particularly expedient if mounting blocks are arranged on the tie beam in the end regions of the beam axially outside of the end faces of the right cylindrical body, with the mounting blocks extending in the peripheral direction up to the projections and having planar mounting surfaces facing away from said segment which extend in the secant direction (i.e. in the direction of chord of the cylindrical body or parallel thereto) and which confront complementary mounting surfaces of the basic members.

Furthermore, provision should be made in this arrangement that the mounting blocks also have mounting surfaces which extend perpendicular to the mounting surfaces extending in the secant direction and which confront complementary mounting surfaces of the basic members.

A particularly expedient practical realisation of this embodiment is characterised in that a U-shaped mount or holder is formed on the basic members and carries the mounting surfaces formed on the basic members; and in that the open side of each U-holder engages around the mounting blocks.

In order to be able to adjust the tie beam relative to the basic members in simple manner a useful further development of the invention provides that the respectively associated mounting surfaces each have an adjustment spacing and can be moved in a defined manner towards or away from one another by distance varying means.

The distance varying means expediently consist of compression or tension screws which can be threaded into threaded bores emerging from the mounting surfaces in the basic members, or in the mounting blocks, up to a depth corresponding to the desired adjustment. In this arrangement the pressure screws hold the tie beam and the basic bodies at a defined adjustable spacing while the tension screws draw the confronting securing surfaces into contact with one another, or against the pressure screws, so that after tightening all the screws a fixed and reliable connection exists in a defined position between the basic members and the tie beam.

It is advantageous for assembly and disassembly when at least one of said openings in one of said basic members has such an extent in the direction away from the tie beam that the carriage with all the components arranged thereon can be pushed through the opening onto the running surfaces and can be introduced into the interior of the regular cylindrical body.

In order to have a further adjustment parameter for the regular cylindrical surface provision can also be made for the regular cylindrical body to have a throughgoing elongate slot in the region of said wall portion, preferably at the level of the center of the tie beam, with the elongate slot being bridged by slot width changing means.

By suitable adjustment of the slot width changing means deformations of the regular cylindrical segment can thus be brought about within certain limits should this prove to be necessary for adjustment purposes.

A particularly reliable and non-disturbable mounting of the regular cylindrical body is obtained if the latter is pushed onto a fitted seat on a regular cylindrical ring projection of the basic members.

The defined advance of the carriage, which is necessary for linewise scanning of the photosensitive material by means of the radial scanning beam, can be realised in that a spindle driven in defined manner, and which extends axially between the basic members, is rotationally journalled at at least one of the basic members and cooperates with a spindle nut provided on the carriage for the defined advance of the carriage.

Finally, it is expedient if the regular cylindrical body is surrounded within the segment at a small distance by a light- impermeable stiff cover.

As the tie beam has exclusively the task of holding the two basic members at a defined position relative to one another and of carrying and axially guiding in trouble-free manner the carriage for the laser scanning arrangement, the component groups which contain the feed roller pair, the deflection rollers and the take-off roller pair are mounted on the basic members. With this arrangement it is expedient if recesses are provided in the basic members to accommodate the said component groups.

The sheet metal guides and cassettes can be mounted at the said component groups. The sheet metal guides for the photosensitive material are however also expediently mounted, in part, on the optically inactive wall section of the transparent cylinder body, because this section is not required for the optical scanning, and would otherwise also not be required for the film guidance.

In order to be able to adjust the modulator with the radial scanning movement of the beam scanning in troublefree manner a further embodiment provides that a deflecting mirror is arranged on the carriage in the angular range of said wall portion in the region of the rotating radial scanning beam and projects the light which falls on it at a corresponding angular position of the rotary mirror onto a synchronisation diode provided on the carriage. Before the start of each peripheral scan, which extends over an angle of approximately 270°, the radial scanning beam thus falls on the said diode which can be used to initiate a start signal for the modulator.

The invention will now be described in the following by way of example with reference to the drawing which shows.

Figure 1:
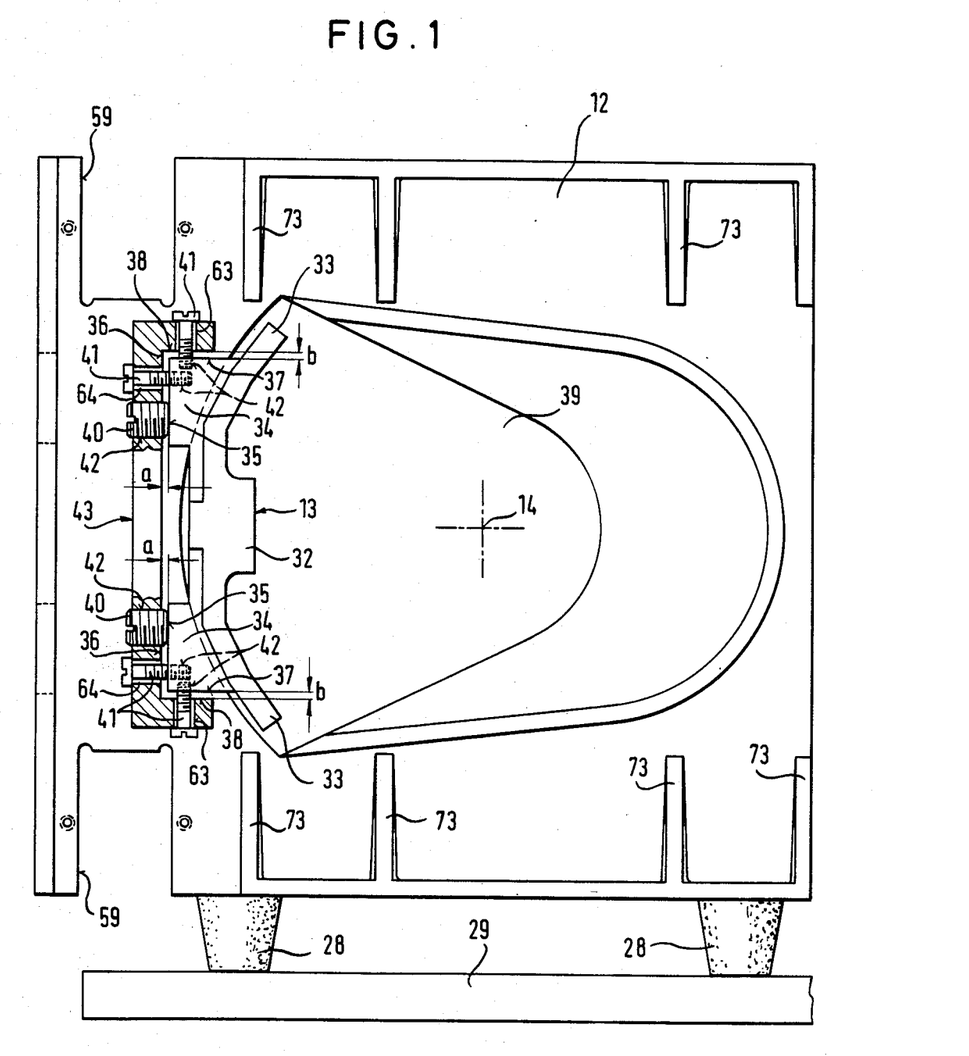
FIG. 1 an end view of a photosetting apparatus in accordance with the invention, with all the components, with the exception of the basic member 12 and the tie beam 13, having been omitted for the sake of clarity, FIG. 2 a partly sectioned end view of the basic member 12 of FIG. 1 from the opposite side to FIG. 1, FIG. 3 a partly sectioned view of the photosetting apparatus on the line III—III in FIG. 2 with the left hand basic member 12 being partly cut-away and the right hand basic member 12 only being indicated in general, FIG. 4 a schematic axial view of the photosetting apparatus of the invention in order to illustrate those component groups which were omitted for the sake of clarity in FIGS. 1 to 3, FIG. 5 a schematic perspective view of the carriage used with the photosetting apparatus of the invention with the laser scanning arrangement arranged thereon, and FIG. 6 plan view of the subject of FIG. 5.
Figure 2:
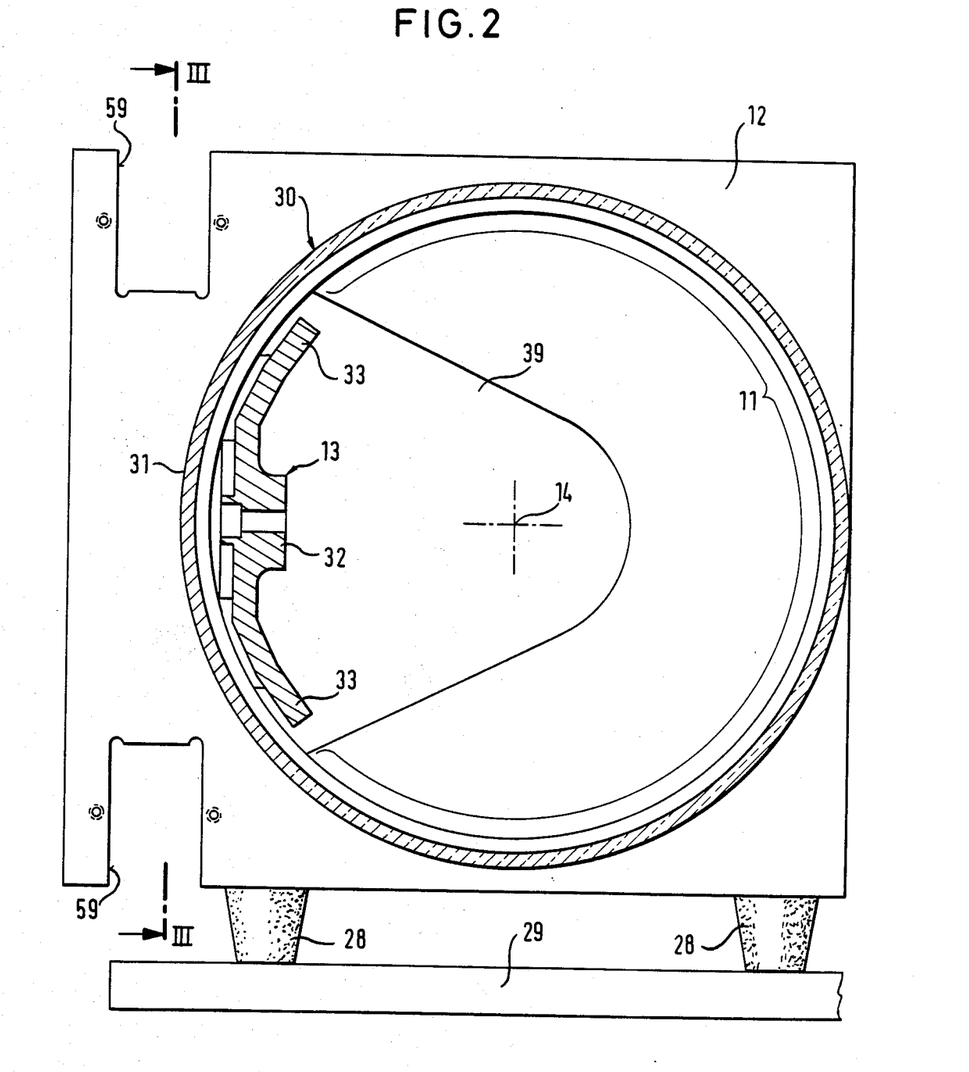
Figure 3:
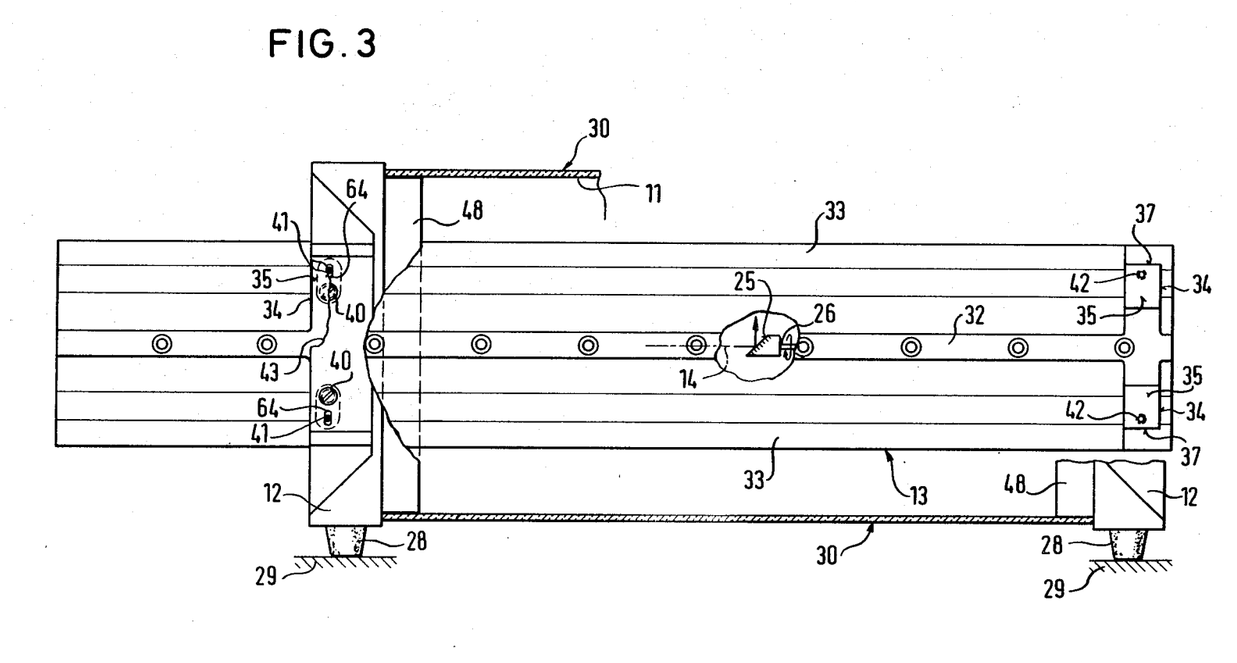

As seen in FIGS. 1 to 3 the photosetting apparatus of the invention has two axially spaced apart plate-like basic members 12 of cast material which are mounted or secured at their lower sides to a frame 29 which is not shown in detail via buffers 28 which serve for vibration damping. Reinforcement ribs 73 (FIG. 1) reinforce the basic members 12 on the axially outer sides.

The basic members 12 have cylindrical ring-like projections 48 on their confronting end faces on which a transparent regular cylindrical body 30 is pushed and which has a diameter which is sufficiently large, for example 30 cm, that a laser scanning arrangement can be arranged in its interior to expose a photosensitive material which is laid around the regular cylindrical body 30.

The two basic members 12 are mechanically rigidly connected together by a tie beam 13 which, in accordance with FIGS. 1 to 3, has a central beam part 32 and projections 33 which extend from the latter essentially in the peripheral direction of the regular cylindrical body 30. The projections 33 and the beam part 32 extend through the interior of the regular cylindrical body 30 close to its inner wall and project through circular sector-like openings 39 slightly beyond the basic member 12 at the right hand side of FIG. 3 and significantly beyond the basic member 12 on the left hand side of FIG. 3. The asymmetrical projection of the tie beam 13 beyond the basic members 12 is brought about by the fact that, with the carriage 15 for the laser scanning arrangement which will be described below, the radial scanning beam is generated asymmetrically relative to a carriage.

As seen in FIGS. 1 and 3 the tie beam 13 has, axially following the position of passing through the openings 39 of the basic members 12, mounting or securing blocks 34 which project rearwardly, with the mounting blocks 34 being cast in the region of the projections 33 onto the tie beam 13, which is likewise constructed as a cast part.

The tie beam 13 is secured as seen in FIG. 1 to the basic members 12 to the side of the cylinder axis 14. It has for this purpose vertical mounting surfaces 35 and horizontal mounting surfaces 37 on the mounting blocks 34 which are respectively confronted by vertical mounting surfaces 36 and horizontal mounting surfaces 38 at distances a and b formed on a U-shaped holder 43 on each of the basic members 12.

The holding together of the mounting blocks 34 with the U holders 43 is ensured by tension screws 41 which are pushed through bores 63 in the limbs of the U holder and which are threaded into threaded bores 42 of the mounting blocks 34, and by further tension screws 41 which extend through holes 64 in the web of the U-shaped holder, which are elongated in the vertical direction, into threaded bores 42 of the mounting blocks 34.

Furthermore, pressure screws 40 are screwed into threaded bores 42 of the web of the U-shaped holder 43 and contact against the mounting surfaces 35 of the mounting blocks 34 as seen in FIG. 1. By suitable adjustment of the pressure screws 40 and of the tension screws 41 the adjustment spacings a and b between the tie beam 13 and the basic bodies 12 can be changed in defined manner. After tightening all the screws an exact relative position is ensured between the basic members 12 and the tie beam 13.

Figure 4:
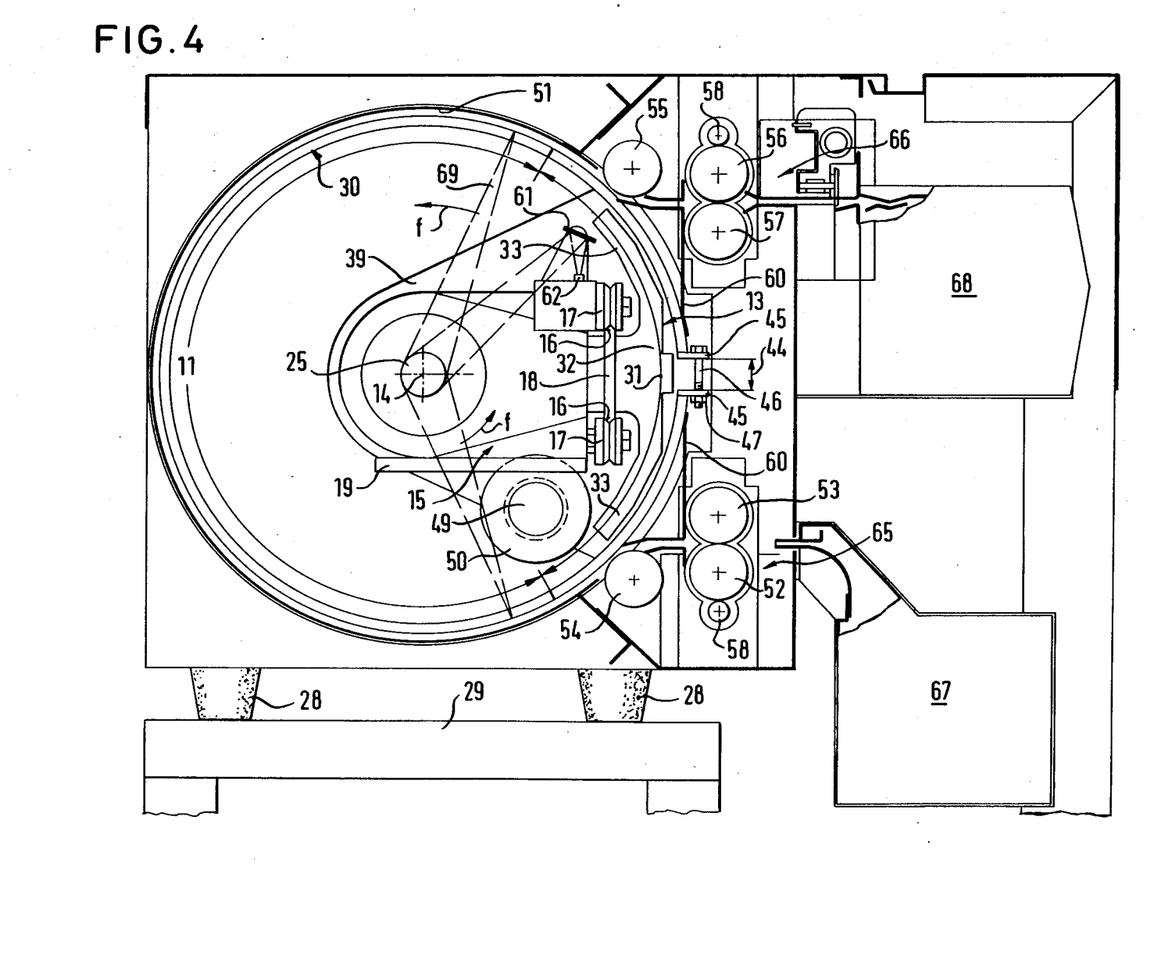

In accordance with FIG. 4 a strip rail 18 is secured with its flat sides standing vertically against the beam part 32 of the tie beam 13. At its upper and lower edges the strip rail has running rail surfaces 16 which are of roof-like construction in which wheels 17 equipped with grooves of complementary construction engage pairwise from above and below with a fitted seat. The pairwise arrangement of the wheels 17 can also be seen in FIGS. 5 and 6.

Figure 5:
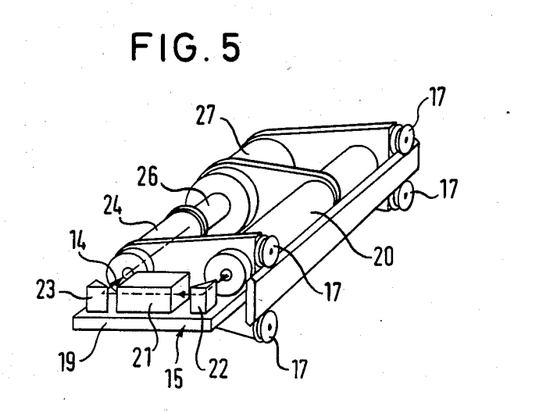
Figure 6:
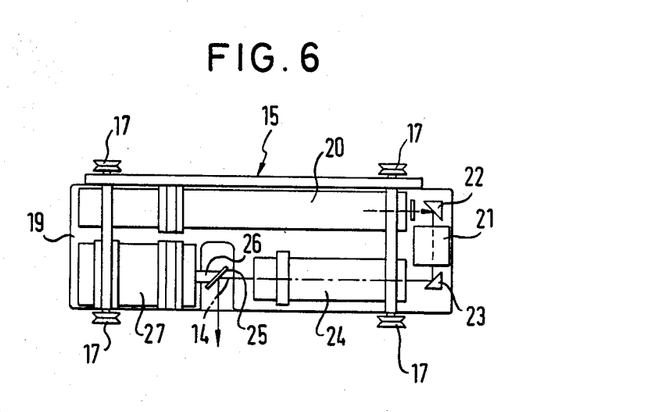

The wheels 17 are arranged on a carriage 15 which extend substantially horizontally from the tie beam 13 into the interior of the regular cylindrical body 30. The carriage 15 has a carrier plate 19 on which the laser scanning arrangement is mounted. This laser scanning arrangement consists, as seen in FIGS. 5 and 6, of a laser 20 which is mounted on the carrier plate 19 near to the tie beam 13 and parallel to the cylinder axis 14. At the right hand end of the carrier plate 19 as seen in FIG. 6 the laser beam is deflected via a 90° deflecting mirror to the transversely arranged modulator 21, while the modulated laser beam emerging from the modulator 21 enters via a further 90° deflecting mirror 23 into the collimator 24 which is mounted on the carrier plate 19 parallel to the laser 15. The sharply bundled laser beam emerges from the collimator 24 and falls onto a rotary mirror 25 which is inclined relative to the cylinder axis 14 through 45° so that it deflects the laser beam to the jacket surface of the regular cylindrical body 30. The rotary mirror 25 is secured to a motor shaft 26 of a motor which can be driven to a rapid rotary movement, with the central axis of the motor shaft 26 coinciding with the axis of the laser beam emerging from the collimator 24, and through appropriate adjustment also with the cylinder axis 14.

As seen in FIG. 4 a running nut 50 with its axis extending parallel to the cylinder axis 14 is arranged on the carriage 15. A spindle 49 engages through the running nut and is mounted in at least one of the basic members 12 in a manner not shown so that it can be driven in defined manner to execute a rotary movement. The carriage 15 can be moved in their defined manner along the fixed tie beam or traverse 13 by rotation of the spindle 49.

If the carriage 15 is located at the start of its travel movement then it extends partly along the region of the tie beam 13 which projects to the left beyond the basic body/basic member in FIG. 3. The radial scanning beam is now generated at the start of the regular cylindrical body 30. On rotating the spindle 49, the carriage 15 moves continuously in the direction of the right hand basic member 12 of FIG. 3 with the radial scanning beam then scanning the interior of the regular cylindrical body 30 linewise.

In order to illustrate the arrangement of the rotary mirror 25 of the motor shaft 26 relative to the tie beam 13 and the basic members 12 the traverse is shown broken away in FIG. 3 approximately at the center, with the rotary mirror 25 with the incident and emergent laser beam and also the motor shaft 26 being shown.

It can be seen from FIG. 4 that the jacket surface of the regular cylindrical body 30 does not have to be completely closed but can as it were, have an elongate slot 44, approximately in the region of the center of the tie beam 13. Angle portions 45 can be mounted at the edges of this elongate slot and can be clamped together in the peripheral direction by one or more bolts 46 and also a nut 47. In this way certain peripheral adjustments of the regular cylindrical body 30 can be effected by suitably loading the two edges by means of the bolts 46.

As seen in FIG. 4 a regular cylindrical cover 51 of light-impermeable material is provided around and spaced apart from the regular cylindrical body 30.

The component group 65 which contains the supply cassette 67 for the photosensitive material, the supply roller pair 52, 53 for the photosensitive material and a deflection roller 54 is merely suspended or secured, in the same way as the component group 66 containing a deflection roller 55, the take-off roller pair 56, 57 and the receiving cassette 68, to the two basic bodies 12. For this purpose the two basic bodies 12 have recesses 59 which can be seen from FIGS. 1 and 2.

The sheet metal guides 60 necessary for the photosensitive material can be secured to the optically inactive wall portion 31 of the regular cylindrical body 30. Further sheet metal guides are mounted on the component groups 65, 66.

As seen in FIG. 4 a deflection mirror 61 is arranged in the upper region of the carriage 15 and near to the upper end of the tie beam 13 in the path of the rotating radial scanning beam 69. The deflecting mirror 61 is detected by the radial scanning beam 69 shortly before the latter starts to scan the photosensitive material. The deflecting mirror 61 deflects the incident laser light downwardly onto a synchronisation photodiode 62 which synchronises the signals supplied to the modulator 21 with the rotary position of the radial scanning beam 69 via a suitable electronic circuit.

It should also be pointed out that in FIG. 4 the carriage is only illustrated very schematically without the optical components which can be seen in FIGS. 5 and 6, with the exception of the rotary mirror 25.

As a result of the described constructional arrangement the regular cylindrical body 30 is subdivided into an optically active, transparent, regular cylindrical segment 11 which extends over an angle of approximately 270° and into an optically inactive wall section 31 which adopts a wall region of approximately 90° but which however plays an important role for the troublefree mounting and adjustment of the regular cylindrical segment 11, and indeed, in particular when the width of the longitudinal slot 44 is variable by means of the bolts 46. The wall section 31 however also stabilises in other respects the troublefree position of the regular cylindrical segment 11.

The assembly and the functioning of the photosetting apparatus of the invention are as follows:

First of all the regular cylindrical body 30 is arranged between the two basic members 12 by pushing it onto the ring projections 48, or the ring projections 48 are pushed into the end face openings of the regular cylindrical body 30. The tie beam is then passed axially through the openings 39 and the regular cylindrical body 30 and secured to the basic members 12 in the manner shown in FIG. 1. The basic members 12 and the tie beam 13 now form a rigid arrangement which carries the regular cylindrical body 30.

In accordance with the invention the sector-like opening 39 of FIGS. 1, 2 and 4 is sufficiently large and extends sufficiently far radially inwardly from the tie beam 30 that the openings 39 together with all the components arranged thereon can be pushed axially onto the strip rail 13. Thereafter the spindle 49 is brought into engagement with the running nut 50.

Finally, the component groups 65, 66 which contain the various cassettes and rollers are mounted in the recesses 59 of the component groups.

The sheet-like photosensitive material is led out of the cassette 67 through the take-in rollers 52, 53 driven by a drive shaft 58, over the deflection roller 54 onto the outer side of the curved cylindrical element 11 and is passed around the regular cylindrical segment 11 and also around the output deflection roller 55 to the take-off rollers 56, 57, which are likewise driven by a shaft 58, from where the material passes into the pick-up cassette 68. By appropriate control of the various rollers a smooth contact is ensured of the photosensitive material on the regular cylindrical body 30 with the photosensitive layer being arranged radially inwardly.

As soon as the photosensitive material has been mounted in the desired position on the periphery of the regular cylindrical segment 11 which extends over 270° the radially scanning laser beam 69 starts its circular scanning movement. The carriage 15 is located during this first of all at the left hand end of the regular cylindrical body 30 as shown in FIG. 3. During the scanning movement of the radial scanning beam 69, for example in the direction of the arrow f of FIG. 4 the carriage is displaced slowly in the axial direction driven by the spindle 49, so that the radial scanning beam 69 scans the photosensitive material linewise with a suitable modulation along the regular cylindrical segment 11. After the carriage 15 has passed through the entire regular cylindrical body 30 the scanning is terminated. It is however not necessary for the carriage 15 to travel over the full length of the regular cylindrical body 30. Partial axial movements are also possible if this is required by special setting problems.

Should the laser emerging from the rotary mirror 25 have its initial point not quite on the cylinder axis 14 after mounting the carriage 15 on the tie beam 13, then the necessary adjustment can be effected by suitable adjustment of the adjusting screws 41, 42. A further possibility is to adjust the bolts 46 of FIG. 4.

What is claimed is:

1. A photosetting apparatus comprising a transparent segment of a regular cylinder around which a photosensitive material can be laid with the photosensitive layer towards the inside, and a rotary mirror illuminated by a laser beam modulated in accordance with the symbols to be set, wherein the rotary mirror is arranged with the laser, the modulator and the image forming optical system on a carriage displaceable in controlled manner along the axis of said segment, and wherein the rotary mirror generates a radial scanning beam which leaves the cylinder axis and executes a rapid periodic scanning movement in the peripheral direction of said segment, characterised in that said segment (11) of a regular cylinder is held at its end faces at two plate-like basic members (12) which rest on a support (29) and which are connected into a rigid arrangement by a tie beam (13) arranged radially spaced apart from the cylinder axis (14) and carried only by the basic members (12), with the tie beam being preferably adjustable relative to the basic members (12) perpendicular to the cylinder axis; and in that the carriage (15) is axially displaceably held on the tie beam (13).

2. A photosetting apparatus in accordance with claim 1, characterised in that the tie beam (13) carries radially inwardly two axially extending profiled running surfaces which are arranged spaced apart in the peripheral direction and which face towards or away from one another; and in that wheels (17) having a complementary profile and arranged reliably outwardly on the carriage (15) contact the profiled running surfaces (16) in such a way that the carriage (15) is radially held against movements in planes extending perpendicular to the cylinder axis (14) and is only movable axially.

3. A photosetting apparatus in accordance with claim 2, characterised in that the running surfaces (16) are formed at the opposite longitudinal edges of a strip rail (18) which is secured to the tie beam (13).

4. A photosetting apparatus in accordance with claim 3, characterised in that the width direction of the strip rail (18) coincides substantially with the peripheral direction or with the direction of a secant.

5. A photosetting apparatus in accordance with claim 3, characterised in that the carriage (15) extends substantially radially inwardly away from the tie beam (13) and in particular from the strip rail (18), and has a carrying plate (19) for the scanning arrangement, with the carrying plate extending past the cylinder axis (14) and being radially spaced therefrom.

6. A photosetting apparatus in accordance with claim 5, characterised in that on the carrying plate (19) there are arranged, optically following one another, the laser (20) near to the running wheels (17) parallel to the cylinder axis (14), the modulator (21) between two deflecting mirrors (22, 23) parallel to the axes of the running wheels (17), the collimator (24) parallel to the laser (20) on the cylinder axis (14), and the rotary mirror (25) inclined at 45° to the cylinder axis (14) and lying thereon, wherein the rotary mirror is secured at the end face of a motor shaft (26) coincident with the cylinder axis (14).

7. A photosetting apparatus in accordance with claim 5, characterised in that the tie beam (13) is arranged at the side at the level of the cylinder axis (14) and the carrying plate (19) extends preferably substantially horizontally.

8. A photosetting apparatus in accordance with claim 7, characterised in that the running surfaces (16) lie spaced apart vertically above one another.

9. A photosetting apparatus in accordance with claim 8, characterised in that the flat side of the strip rail (18) lies in a vertical plane.

10. A photosetting apparatus in accordance with claim 1, characterised in that the two basic members (12) are mounted via resilient buffers (28) on a carrying frame (29).

11. A photosetting apparatus in accordance with claim 1, characterised in that said segment (11) is constructed on an at least approximately closed regular cylindrical body (30); and in that the tie beam (13) is arranged within the regular cylindrical body (30) near to the wall portion (31) thereof remote from said segment, extends through openings (39) in the basic members (12) and is secured to the basic members (12) axially outside of the end faces of the regular cylindrical body.

12. A photosetting apparatus in accordance with claim 11, characterised in that the tie beam (13) has a shape resembling a segment of a cylinder which is matched to the curvature of the wall portion (31).

13. A photosetting apparatus in accordance with claim 12, characterised in that the tie beam (13) extends in the peripheral direction over an angle of approximately 90° and preferably over a few degrees less than 90°.

14. A photosetting apparatus in accordance with claim 12, characterised in that cylinder segment-like narrow projections (33) emerge in opposite peripheral directions from the central beam part (32) on which the running surfaces (16) or the strip rail (18) are arranged.

15. A photosetting apparatus in accordance with claim 14, characterised in that mounting blocks (34) are arranged on the tie beam (13) in the end regions of the beam (13) axially outside of the end faces of the right cylindrical body (30), with the mounting blocks extending in the peripheral direction up to the projections (33) and having planar mounting surfaces (35) facing away from said segment which extend in the secant direction and which confront complementary mounting surfaces (36) of the basic members (12).

16. A photosetting apparatus in accordance with claim 15, characterised in that the mounting blocks (34) also have mounting surfaces (37) which extend perpendicular to the mounting surfaces (35) extending in the secant direction and which confront complementary mounting surfaces (38) of the basic members (12).

17. A photosetting apparatus in accordance with claim 15, characterised in that a U-shaped holder (43) is formed on each of the basic members (12) and carries the mounting surfaces (36, 38) formed on the basic members (12) and in that the open side of each U-holder (43) engages around the associated mounting blocks (34) on said tie beam.

18. A photosetting apparatus in accordance with claim 16, characterised in that the respectively associated mounting surfaces (35, 36; 37, 38) each have an adjustment spacing (a; b) and can be moved in a defined manner towards or away from one another by distance varying means (40, 41, 42).

19. A photosetting apparatus in accordance with claim 18, characterised in that the distance varying means consist of compression or tension screws (40, 41) which can be threaded into threaded bores emerging from the mounting surfaces (35, 36, 37) in the basic members (12), or in the mounting blocks (34), up to a depth corresponding to the desired adjustment.

20. A photosetting apparatus in accordance with claim 11, characterised in that at least one of said openings (39) in one of said basic members has such an extent in the direction away from the tie beam (13) that the carriage (15) with all the components arranged thereon can be pushed through the opening (39) onto the running surfaces (16) and can be introduced into the interior of the regular cylindrical body (30).

21. A photosetting apparatus in accordance with claim 11, characterised in that the regular cylindrical body (30) has a throughgoing longitudinal slot (44) in the region of said wall portion (31), preferably at the level of the center of the beam (13), with the longitudinal slot being bridged by slot width changing means (45, 46, 47).

22. A photosetting apparatus in accordance with claim 11, characterised in that the regular cylindrical body (30) is pushed onto a regular cylindrical ring projection (48) of the basic members (12).

23. A photosetting apparatus in accordance with claim 1, characterised in that a spindle (49) driven in defined manner and which extends axially between the basic members (12) is rotationally journalled at at least one of the basic members (12) and cooperates with a spindle nut (50) provided on the carriage (15) for the defined advance of the carriage (15).

24. A photosetting apparatus in accordance with claim 11, characterised in that the regular cylindrical body (30) is surrounded within the segment (11) at a small distance by a light impermeable rigid cover (51).

25. A photosetting apparatus in accordance with claim 1, characterised in that the groups of components containing the feed roller pairs (52, 53), the deflection rollers (54, 55) and the take up roller pair (56, 57) are mounted on the basic members (12).

26. A photosetting apparatus in accordance with claim 25, characterised in that recesses (59) are provided in the basic members (12) to accommodate said groups of components.

27. A photosetting apparatus in accordance with claim 1, characterised in that the sheet metal guides (60) for the photosensitive material are partly mounted on the wall section (31) of the regular cylindrical body (30).

28. A photosetting apparatus in accordance with claim 11, characterised in that the regular cylindrical body consists of one piece and is transparent throughout.

29. A photosetting apparatus in accordance with claim 1, characterised in that a deflecting mirror (61) is arranged on the carriage in the angular range of the wall section (31) in the region of the rotating radial scanning beam and projects the light which falls on it at a corresponding angular position of the rotary mirror (25) onto a synchronisation diode (62) provided on the carriage (15).

* * * * *